United States Patent [19]

Lossev

[11] B 3,999,584

[45] Dec. 28, 1976

[54] TRACTION MEANS FOR RESILIENT TIRES OF MOTOR VEHICLES

[76] Inventor: Alexander Lossev, 1480 Rte. 46, Apt. 294, Parsippany, N.J. 07054

[22] Filed: Feb. 25, 1974

[21] Appl. No.: 445,690

[44] Published under the second Trial Voluntary Protest Program on February 3, 1976 as document No. B 445,690.

[52] U.S. Cl. .......................... 152/213 R; 152/178; 152/185; 152/232; 152/239
[51] Int. Cl.² .......................................... B60C 27/08
[58] Field of Search ... 152/213 R, 213 A, 221–230, 152/171, 172, 178, 179, 180, 182, 185, 187, 190, 191; 81/15.8

[56] References Cited

UNITED STATES PATENTS

| | | | |
|---|---|---|---|
| 1,399,179 | 12/1921 | Angelo | 152/171 |
| 2,580,272 | 12/1951 | Bell | 152/221 |
| 2,754,873 | 7/1956 | Willis | 152/229 |
| 3,042,095 | 7/1962 | Knowles | 152/213 |
| 3,079,971 | 3/1963 | Iaquinta | 152/179 |
| 3,251,392 | 5/1966 | Connell | 152/228 |
| 3,675,701 | 7/1972 | Garrison | 152/225 |

Primary Examiner—Drayton E. Hoffman

[57] ABSTRACT

A traction attachment for the drive wheels of motor vehicles comprising a number of interconnected traction units self applicable to a tire by interposed spring means in resilient response to pressure exerted by a wheel longitudinally progressing thereover and provided with self locking means connecting the ends thereof.

3 Claims, 2 Drawing Figures

TRACTION MEANS FOR RESILIENT TIRES OF MOTOR VEHICLES

The present invention relates to resilient tires of motor vehicles and, in particular, to the traction means therefor. The principal object of this invention is to provide the drive wheels of motor vehicles with effective traction means self applicable to the tires in response to pressure exerted by rolling the wheels thereover. Another object of this invention is to facilitate such means so that anybody, even persons handicapped by age or health, can attach them to or remove them from the tires instantly and effortlessly.

The hereafter described attachment comprises a number of interlinked traction units capable of encircling the tire and of forming an endless catenation on the ground contacting face thereof.

Figure 1:
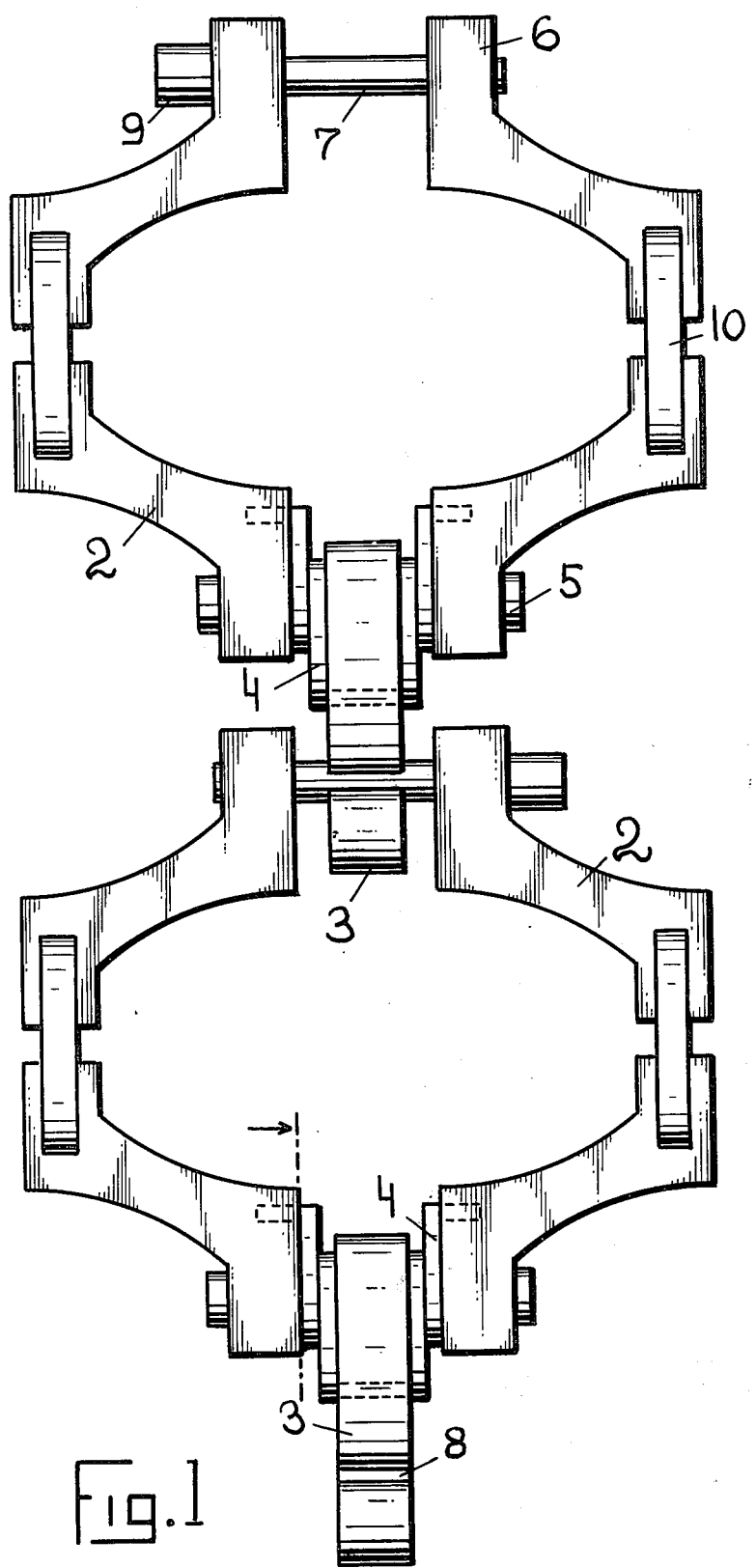
FIG. 1 is a partial plan view of the attachment in a flattened position.
Figure 2:
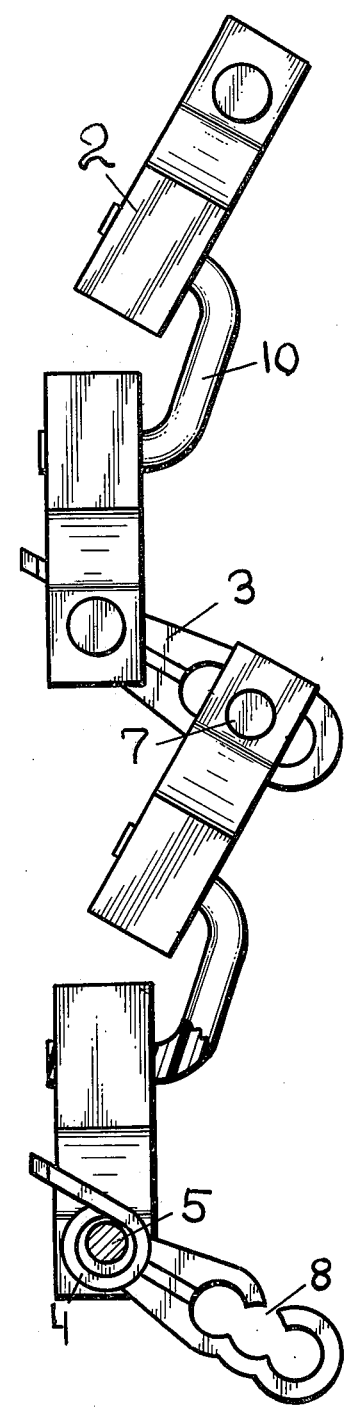
FIG. 2 is a side elevation of the attachment showing the angular correlation of the parts thereof.

Referring to the characters of reference the numerals 2 denote ground and tire gripping components composing said traction units. The components 2 are preferably molded of a tough resilient material and are provided with perforated lugs 6 through which the connecting elements extend. Each of said traction units comprises two pairs of components 2 intended to cover in use the ground contacting face of a tire in widely spaced configuration, preferably as shown in FIG. 1 of the drawing. The connective bolt 7 extends through the perforated lugs 6 in threaded engagement therewith and releasably combines one pair of components 2. It is however understood that instead of threaded means the bolt 7 may be retractably engaged with lugs 6 by other conventional means. Another pair of components 2 is joined by the shaft 5 extending through the perforated lugs 6 in pivotal relation therewith. The ends of components 2 extending, in use, beyond the brinks of the ground contacting face of a tire are bilaterally joined by resilient forms 10 deeply imbedded in the components 2 and maintaining angular correlation thereof. In order to prevent the attachment from sliding off the tire sideways the forms 10 project upward enough to engage the tire or a part thereof. It is also comtemplated that instead of forms 10 other conventional means of joining the ends of components 2 including integral molding thereof in angular correlation may also be used. A coupling arm 3 is pivotally attached to each of the traction units by the shaft 5 extending through an opening at one end of said arm 3. An opening 8 at the other end of the arm 3, having a pair of inwards curled clamps as shown in FIG. 2, is adapted to receive and trap the retractable bolt 7 of the next adjacent unit securely coupling said units together.

Each of traction units and thereto attached coupling arms 3 are maintained in angular relation with respect to each other by interposed spring means 4 which are preferably coiled about the shaft 5 and have one end attached to the arm 3 but the other end releasably engaged with said unit. It is readily understood that heavy pressure exerted by rolling a tire over the attachment will flatten the angular profile thereof and develop powerful torsion in the spring means 4. As the wheel is passing over the attachment, the traction units in consecutive order will emerge from under the tire and restitution of spring means 4 will pivotally turn each unit on the shaft 5 into close contact with the peripheral face of tire. Since the opening 8, as shown in FIG. 2, is not in the center of the terminal outline of the arm 3, the units will cling to the peripheral face of the tire rather than fall off onto the ground as would be a natural tendency. In that way each of the traction units will be supported by the retractable bolt 7 of the next adjacent unit and the attachment in articular formation will encircle the tire until the ends thereof will meet. The inwards curled clamps of the opening 8, as seen in the FIG. 2, provide enough tolerance for possible minor variations in position of the opening 8 in respect to the trajectory of the bolt 7 and the latter will be forced by the tire to enter and be trapped in the opening 8 of the last in the row arm 3 securely linking the ends of the attachment together. While the spring actuated means to apply the attachment upon the ground contacting face of a tire have been disclosed, it is to be understood that a variety of resilient means may be used instead of described spring means 4. In each unit, for example, the coupling arm 3 may be fixedly attached to the shaft 5 in angular relation with the horizontal plane of the unit. Being depressed by rolling a tire in longitudinal direction over the attachment, the arm 3 will twist the shaft 5 and develop torsion in resilient means integrally formed with or attached to the shaft 5 in releasable engagement with the traction components 2. When the units in orderly succession will emerge from under the tire, the consecutive restitution of said resilient means will mount the attachment upon the peripheral face of a tire.

In order to apply the attachments to the tires, they should be spread on the ground in the path of the drive wheels and the vehicle driven over them lengthwise in a direction downward from the top of FIG. 1 as shown in the drawing. As the vehicle passes over, the emerging from under the wheels attachments will encompass the tires, as was described more definitely before, and secure self thereupon by linking opposite end portions together.

In order to take the attachments off the tires, one of the bolts 7 in each attachment should be unscrewed and lengthwise drawn out of the opening 8 by means of the head 9 positioned alternately on either side of the attachment. This will disengage the coupling and the vehicle, being driven in a direction opposite to that described before, will dismount the attachments and leave them behind spread on the ground. The attachments then may be picked up and folded for storage.

While one embodiment of this invention has been disclosed it is to be understood that the inventive idea may be carried out in a number of ways without deviation from the objects set forth in the preamble of this specification. This diclosure is therefore not to be limited to the precise details described but is intended to cover all variations and modifications thereof falling within the spirit of this invention and the scope of the appended claims.

I claim:

1. A traction attachment for resilient tires comprising a plurality of interlinked traction units each provided with a coupler arm pivotally linking it in releasable relation with the next adjacent unit thus to form catenation of a length sufficient to encircle the peripheral face of a tire; each of said traction units includes:

a. a number of traction components each having perforations in one end portion thereof, b. centrally disposed connector elements extending through said perforations for joining said traction components into pairs extending in use transversely across the ground contacting face of a tire, one of said connector elements in each unit being retractable,
c. bilaterally disposed resilient elements coupling said pairs of traction components together in angular correlation, and
d. bilaterally disposed means for engagement with the side portions of a tire between them, Said traction attachment also includes: self-applicable means comprising a plurality of resilient means interposingly maintaining angular relation between every one of said traction units and thereto attached coupler arm and reciprocally reacting to pressure being exerted by longitudinally rolling the tire over said attachment, and interlocking means disposed at one end of said attachment and a retractable element at the other end thereof providing in combination means for securing said attachment on the tire by connecting the opposite ends thereof together by rolling a tire thereover.

2. A traction attachment for resilient tires as defined in claim 1, wherein each traction unit has the laterally disposed traction components integrally joined into a single construction each capable of maintaining resilient conformity to the shape of a tire rolling thereover.

3. A traction attachment for resilient tires as defined in claim 1, wherein the coupler arm in each of said traction units is fixedly attached to the nonretractable connector element which is releasably engaged with the traction components by resilient means maintaining angular relationship between said traction unit and the thereto attached coupler arm.

* * * * *